United States Patent [19]
Culver

[11] Patent Number: 5,235,868
[45] Date of Patent: Aug. 17, 1993

[54] MECHANISM FOR GENERATING CONTROL SIGNALS

[76] Inventor: Craig F. Culver, 201 Ware Rd., Woodside, Calif. 94062

[21] Appl. No.: 770,795

[22] Filed: Oct. 2, 1991

[51] Int. Cl.$^5$ .............. G09G 9/02; G09G 1/00
[52] U.S. Cl. .............. 74/471 XY; 273/148 B; 340/706; 340/710
[58] Field of Search .......... 74/471 XY, 471 R; 340/706, 709, 710; 338/123, 132, 133; 178/18; 273/148 B

[56] References Cited

U.S. PATENT DOCUMENTS

| | | | |
|---|---|---|---|
| 4,670,743 | 6/1987 | Zemke | 74/471 XY X |
| 4,712,101 | 12/1987 | Culver | 340/710 |
| 4,724,715 | 2/1988 | Culver | 74/471 R |
| 4,799,049 | 1/1989 | Avila | 340/709 |
| 4,823,634 | 4/1989 | Culver | 74/471 XY |
| 4,896,554 | 1/1990 | Culver | 74/471 XY |
| 4,982,618 | 1/1991 | Culver | 74/471 XY |
| 5,126,723 | 6/1992 | Long et al. | 340/710 |

Primary Examiner—Rodney H. Bonck
Assistant Examiner—Andrea Pitts
Attorney, Agent, or Firm—Skjerven, Morrill, MacPherson, Franklin & Friel

[57] ABSTRACT

A mechanism is provided for producing control signals for use in controlling equipment which includes a rotatable cylinder having on the surface thereof grooves which act with one or more gears to directly translate the rotation or sliding movements of the cylinder to encoders. In other embodiments, switches are activated by pressure on certain elements of the mechanism.

20 Claims, 8 Drawing Sheets

MECHANISM FOR GENERATING CONTROL SIGNALS

FIELD OF THE INVENTION

This invention relates to a cylindrical mechanism for producing control signals in response to inputs from a user and, in particular, to a control mechanism suitable for controlling the values of a plurality of parameters used in controlling equipment.

BACKGROUND OF THE INVENTION

Cylindrical mechanisms for controlling equipment are well-known. For example, U.S. Pat. No. 4,712,101, issued Dec. 8, 1987 and entitled "Control Mechanism For Electronic Apparatus," discloses a cylinder mounted on a rotatable shaft such that the shaft rotates with the cylinder. The cylinder also moves longitudinally relative to the shaft. A first encoder responsive to the rotation of the shaft adjusts a first electrical signal and a second encoder responsive to the linear movement of the cylinder relative to the shaft adjusts a second electrical signal. When applied to the mouse inputs of a computer, the cursor on the CRT display of the computer can be moved as a function of the rotation and the linear motion of the cylinder.

U.S. Pat. No. 4,724,715, issued Feb. 16, 1988 and entitled "Control Mechanism For Computer Keyboard And The Like," discloses a related mechanism for controlling equipment, such as a cursor on a CRT, wherein an analog element is rotatably mounted on a guide member and is movable relative to and longitudinally along the guide member. A first encoder senses rotation of the element relative to the guide member and a second encoder senses linear movement of the element relative to the guide member. In various embodiments of the above mechanisms, the user can also depress the entire mechanism to produce an additional signal capable of controlling a value or generating a signal usable for controlling a third parameter.

Other mechanisms employing a movable cylindrical element for providing control signals for use in controlling equipment are shown in, for example, U.S. Pat. Nos. 4,823,634, 4,896,554, and 4,982,618, all of which are inventions of Craig F. Culver. See also U.S. Pat. No. 4,799,049, issued January, 1989 to Avila.

However, a need arises for reducing the number of parts in these mechanisms, thereby decreasing assembly time and material cost, while maintaining a high degree of reliability. A need further arises for an improvement which may apply to all the controls described above.

SUMMARY OF THE INVENTION

In accordance with this invention, a mechanism for producing control signals for use in controlling equipment comprises a rotatable and longitudinally movable cylindrical member having on the surface thereof grooves which mate with one or more coupling members to directly translate the rotation and longitudinal movements of the cylindrical member to encoders.

In one embodiment of the invention, the cylindrical member providing part of the control surface is mounted in a longitudinally movable bar. A coupling member positioned for contact with this longitudinally movable bar directly translates linear motion of the movable bar into signals for use in controlling equipment. In another embodiment of the invention, the movable bar, and other elements of the control structure, are depressible to generate a control signal in addition to those signals generated by rotation or longitudinal movement of the cylindrical member. In another embodiment, means for imparting force coupled to the cylindrical member and the movable bar provide motive feedback to those elements.

The mechanism of this invention provides a more economical and more easily manufacturable structure than certain of the prior art mechanisms while at the same time providing an elegant and ergonomic method for generating control signals for use, for example, in controlling the operation of a cursor on a video display. This invention will be more fully understood in light of the following description taken together with the drawings.

The following description is meant to be illustrative only and not limiting. Other embodiments of this invention will be obvious in view of the following description.

DETAILED DESCRIPTION

Figure 1:
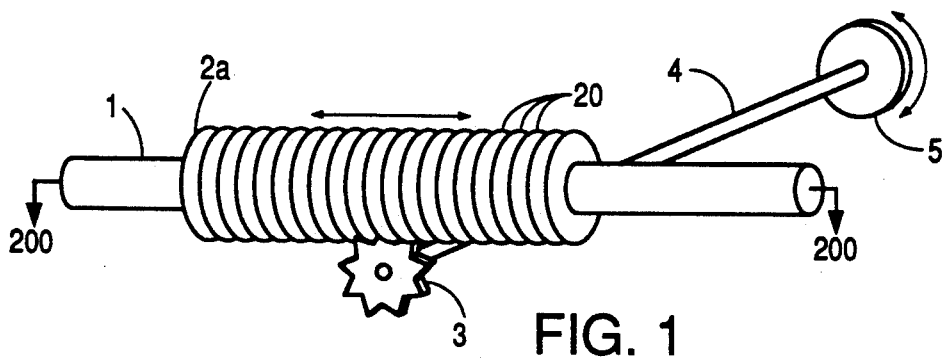
FIG. 1 illustrates a control mechanism including a cylinder with annular grooves engaged with the teeth of a rotatable gear which allows longitudinal movement of the cylinder to be directly translated to an encoder.

In FIG. 1, a fixed shaft 1 supports a rotatable and slidable tubular cylinder 2a which is used as part of the control mechanism. The outer surface of cylinder 2a has a plurality of annular grooves 20, shaped such that a cross section along axis A would display a set of gear teeth as would typically be found in a rack-type gear. A rotatable pinion 3 is supported orthogonally relative to cylinder 2a such that the teeth of pinion 3 mesh with grooves 20 of cylinder 2a. Pinion 3 is fixedly connected to a shaft 4 which drives a code wheel 5. Note that although the pinions as seen in all the figures are round, other coupling means of other shapes, including but not limited to semicircular and straight, may be used in the present invention.

When cylinder 2a is rotated about axis A, the teeth of pinion 3 slide freely within annular grooves 20 of cylinder 2a. However, when cylinder 2a is moved longitudinally along the shaft, pinion 3 rotates. The rotation of pinion 3 causes code wheel 5 to rotate in direct proportion to the amount of longitudinal cylinder movement.

Figure 2:
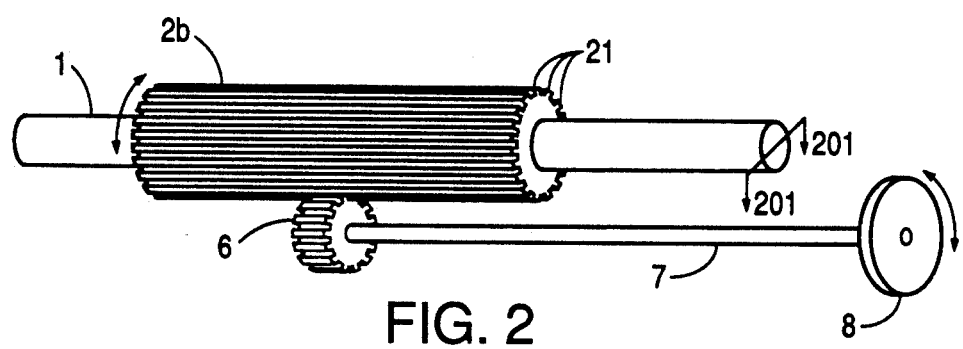
FIG. 2 illustrates a control mechanism including a cylinder having longitudinal grooves engaged with the teeth of a rotatable gear which allows the rotation of the cylinder to be translated directly to an encoder.

In another embodiment of the present invention, the cylinder's outer surface has a set of longitudinal grooves 21, as shown in FIG. 2, shaped such that a cross-section along axis B displays a circular toothed gear. Rotatable pinion 6 is supported parallel to cylinder 2b such that the teeth of pinion 6 mesh with grooves 21 on cylinder 2b. Pinion 6 is fixedly connected to shaft 7 which drives code wheel 8.

When cylinder 2b is moved longitudinally along support shaft 1, the teeth of pinion 6 slide freely in grooves 21 of cylinder 2b. However, when cylinder 2b is rotated, pinion 6 is also rotated. This rotation causes code wheel 8 to rotate in direct proportion to the amount of rotation of cylinder 2b.

Figure 14:
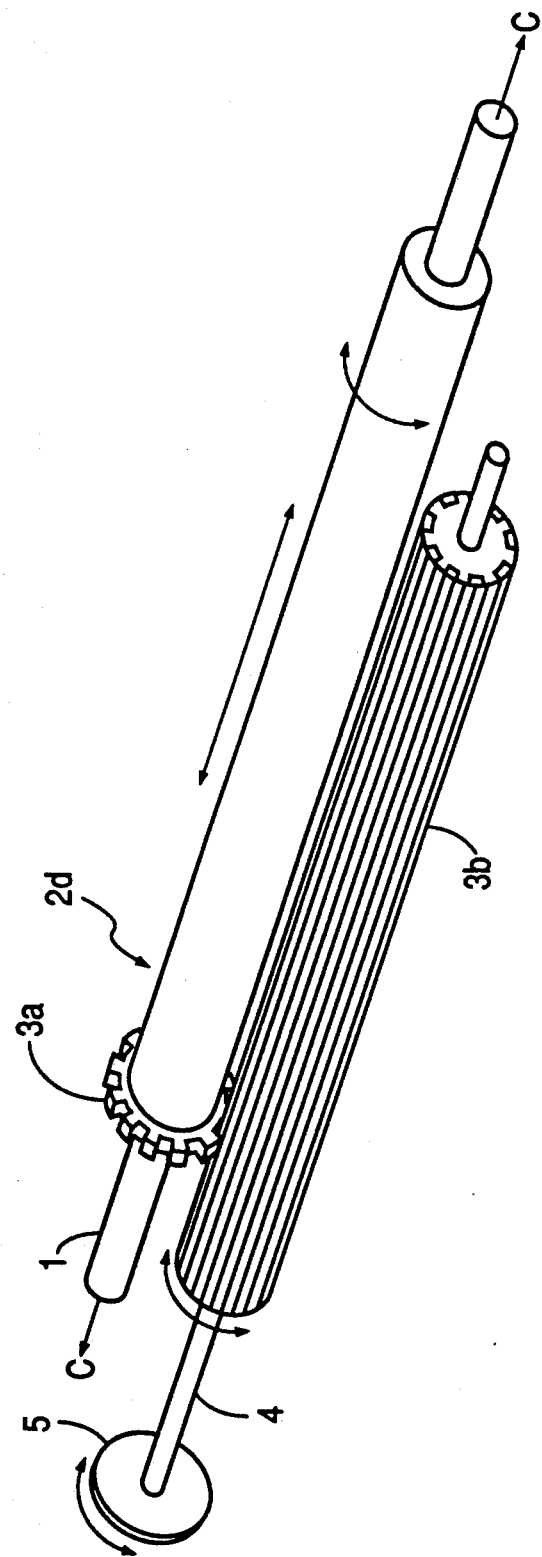
FIG. 14 shows a variation of the embodiment shown in FIG. 2.

A variation in the above embodiment is shown in FIG. 14. In this embodiment, control cylinder 2d has a pinion 3a mounted on the cylinder's surface, while pinion 3b (the movable coupling element shown as pinion 3 in FIGS. 1 and 2) is elongated with grooves extending longitudinally on its surface. A fixed shaft 1 permits rotation and longitudinal movement of control cylinder 2d along axis C. A toothed pinion 3a is affixed to cylinder 2d at a predetermined position and, hence, moves with cylinder 2d. The elongated pinion 3b is rotatably supported so that its grooves are meshed with the teeth of pinion 3a. In this configuration, cylinder 2d moves longitudinally along shaft 1 without causing movement of pinion 3b, but any rotation of cylinder 2d imparts a proportional rotation of pinion 3b. Movement of pinion 3b is translated to an encoder 5 via shaft 4. Longitudinal movement of cylinder 2d may be accomplished using conventional methods which are, therefore, not described in detail. The above embodiment is preferred where the application prohibits the use of coupling grooves along the length of the control cylinder.

Figure 3:
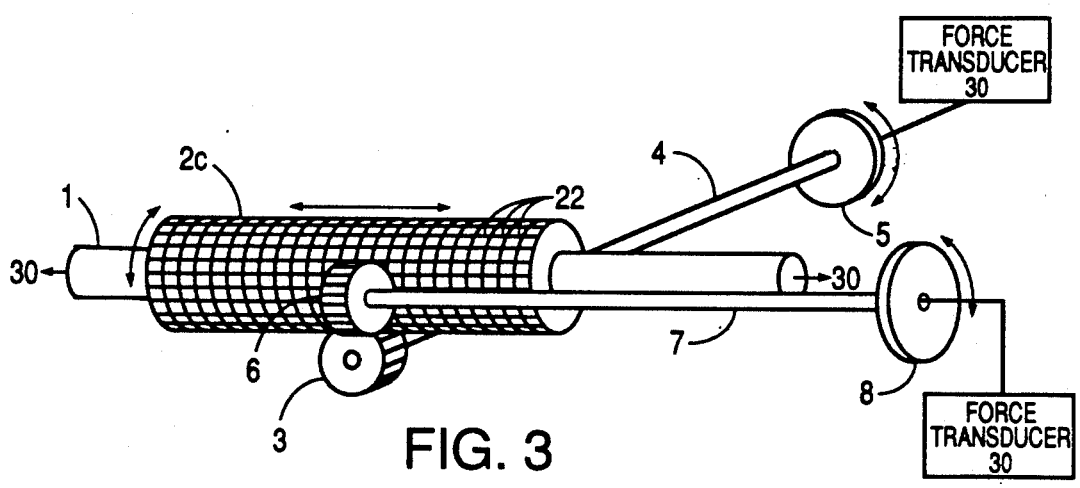
FIG. 3 shows a cylinder having both annular and longitudinal grooves thereby forming a grid pattern suitable for engaging the teeth of two gears, which allows both longitudinal and rotational motion of the cylinder to be directly translated to encoders.

In another embodiment of the present invention, the outer surface of cylinder 2c, shown in FIG. 3, has both annular and longitudinal grooves which intersect each other, resulting in a series of evenly-spaced, raised squares 22 on the surface of cylinder 2c. In this manner, the grid-like surface of cylinder 2c effectively meshes with pinions which are generally positioned at right angles to each other. In FIG. 3, two pinions are shown engaged with the surface of cylinder 2c. In one embodiment, rotatable pinion 3 is supported orthogonally relative to the longitudinal axis 30 of cylinder 2c and detects longitudinal cylinder movement, while pinion 6 is supported parallel to the longitudinal axis 30 of cylinder 2c and detects cylinder rotation. The movement of one pinion is completely independent of movement of the other pinion. In other words, movement of pinion 3 does not effect the movement of pinion 6, and vice versa. Thus, in this embodiment, both longitudinal cylinder movement and rotation are independently detected. Note that pinions 3 and 6 need not be supported orthogonally and parallel to the longitudinal axis, respectively, to effectively detect cylinder movement. In fact, pinions 3 and 6 may be positioned at a considerable deviation from either of these two angles with no loss of detection capability. The critical feature is that projections on these pinions mate satisfactorily with the grooves on cylinder 2c. Hence, the grooves (and corresponding projections) may take many forms, including but not limited to squares, circles, and triangles. Moreover, another embodiment of the present invention has annular grooves on a first end of the cylinder and longitudinal grooves on the second end. Pinions 3 and 6 are positioned at the first and second ends, respectively, to detect longitudinal movement and rotation of the cylinder.

Figure 11:
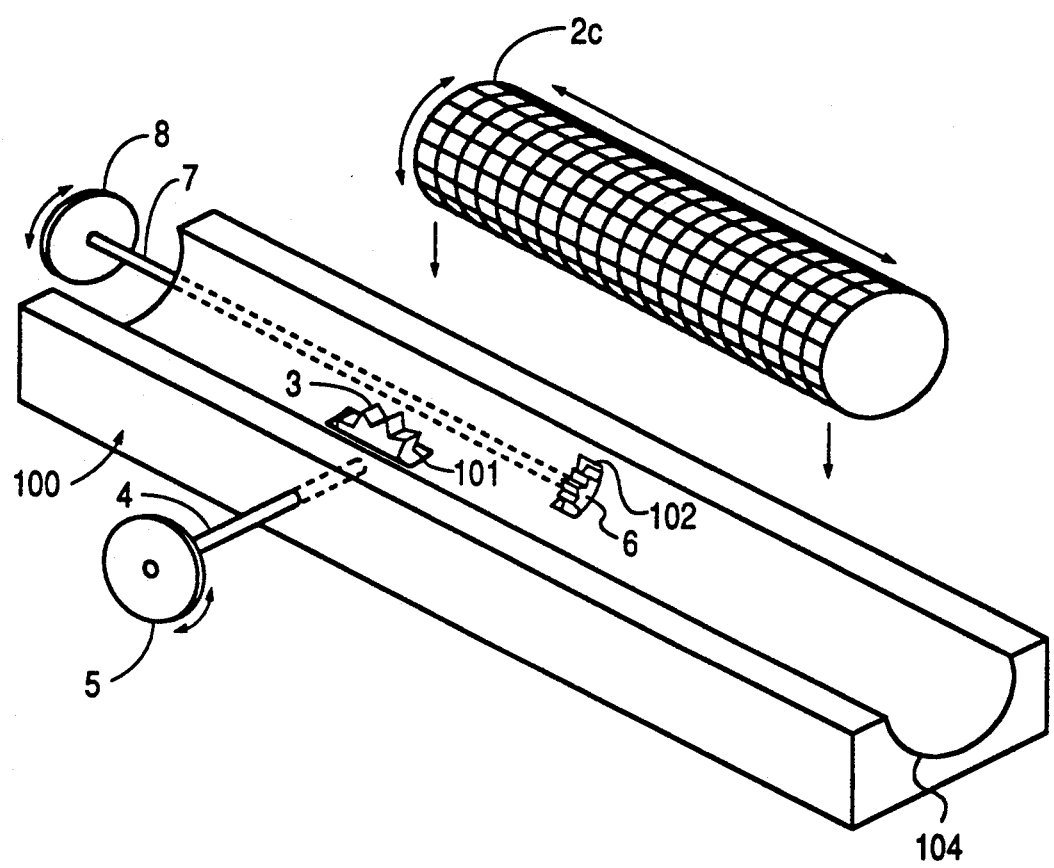
FIG. 11 illustrates another embodiment of the present invention including a body having a concave surface in which to mount the cylinder.

FIG. 11 shows an exploded view of another embodiment of the present invention which eliminates shaft 1 (as shown in FIGS. 1, 2, and 3). In this embodiment, body 100 has a concave surface 104 which has notches 101 and 102 for positioning of pinions 3 and 6, respectively. Pinions 3 and 6 are supported by shafts 4 and 7 which are coupled to code wheels 5 and 8, respectively. Control cylinder 2c is rotatable and slidable relative to body 100. When cylinder 2c is situated in concave surface 104, the grooves on cylinder 2c mesh with the teeth of pinions 3 and 6 such that rotation of cylinder 2c drives pinion 6 while linear motion of cylinder 2c drives pinion 3.

Figure 4:
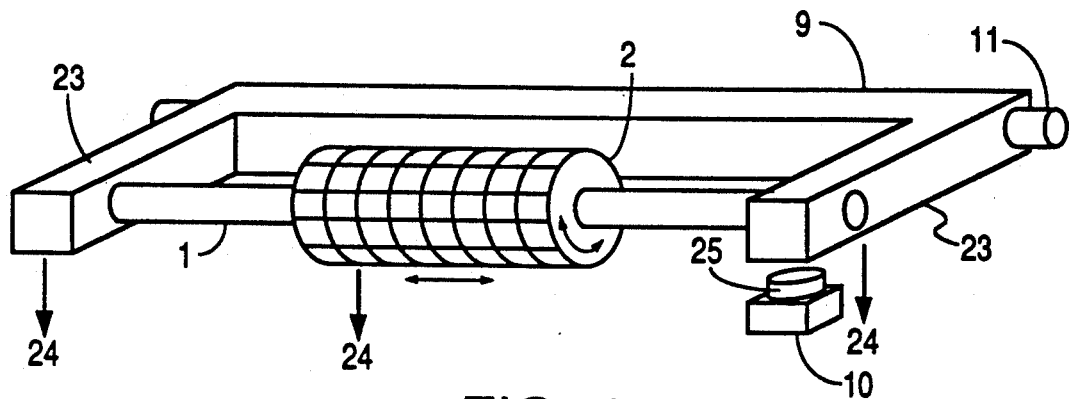
FIG. 4 illustrates a cylinder and shaft in accordance with this invention mounted in a support structure wherein the support structure is depressible, thereby actuating a switch or some other mechanism.
Figure 6:
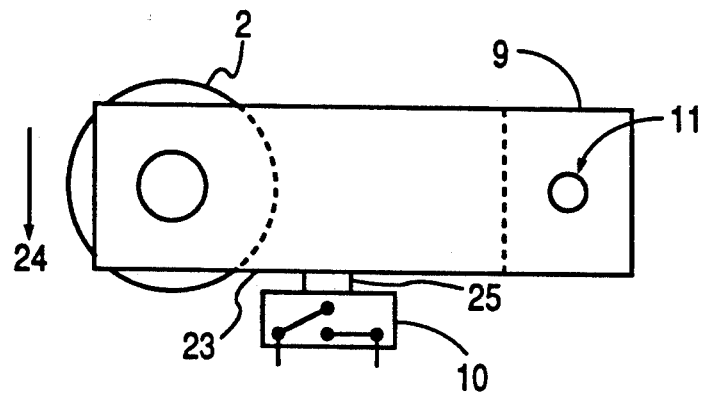
FIG. 6 illustrates an end view of the structure shown in FIG. 4.

FIG. 4 shows an illustrative support structure for a shaft and cylinder (as shown in FIGS. 1, 2, or 3). In this embodiment, hinge pins 11 are fitted at the rear of U-shaped frame 9 to permit a limited degree of vertical movement of arms 23. Shaft 1 is connected to arms 23 of frame 9 by, for example, bolting, or any other well-known method. As seen in FIGS. 4 and 6, a switch 10 is positioned under frame 9 such that an arm 23 rests in contact with the switch actuator 25. In this manner, when an operator exerts a downward pressure (as indicated by arrows 24 on cylinder 2, shaft 1, or arms 23 of frame 9), arms 23 pivot about hinges 11, thereby depressing switch actuator 25 which generates a control signal. Switch 10 may be a contact-type switch to generate one or more binary signals, or switch 10 may be a force-sensing switch which generates a proportional signal.

Figure 5:
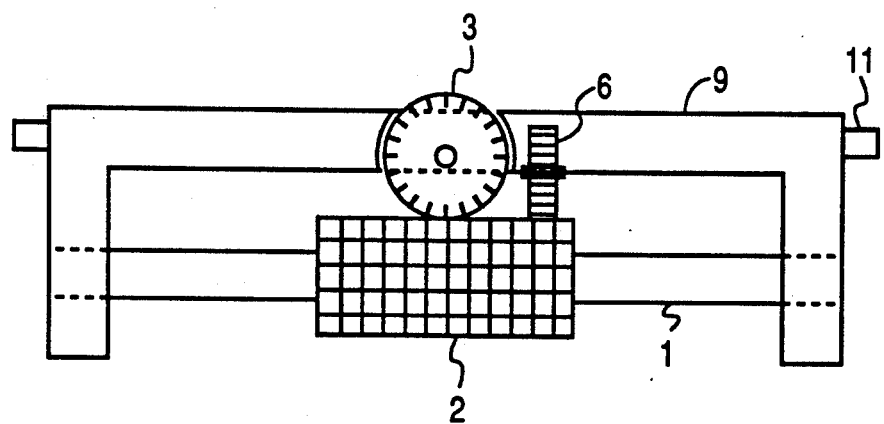
FIG. 5 illustrates a bottom view of the structure of FIG. 4 showing, in addition, gears 3 and 6 which convert longitudinal and rotational movement, respectively, into a rotational movement suitable for use in an encoder.

FIG. 5 illustrates a control mechanism with the support structure of FIG. 4 incorporating two meshing pinions 3 and 6. Generally, pinions 3 and 6 are positioned so that they remain engaged with cylinder 2 irrespective of its movement. The code wheels (not shown) associated with pinions 3 and 6 may be integrated into the control mechanism as individual parts. In another embodiment, the code wheels are directly coupled to pinions 3 and 6.

Figure 7:
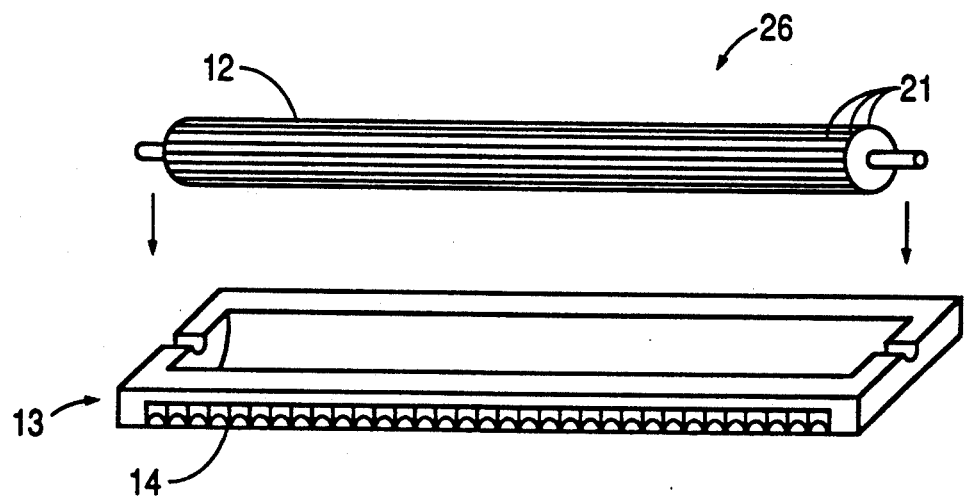
FIG. 7 illustrates in exploded view a rotatable cylinder in accordance with this invention and the longitudinally movable bar in which this rotatable cylinder is journalled.

FIG. 7 illustrates another embodiment of the present invention wherein a rotatable cylinder 12 is journalled in a longitudinally movable bar 13. In this embodiment, the outer surface of cylinder 12 includes longitudinal grooves 21 as were seen in FIG. 2. One side of movable bar 13 is furnished with a set of gear teeth 14, similar to those in a geared rack. The bottom of movable bar 13 or the side opposite to gear teeth 14, is provided with a long open slot (not shown). In this manner, a pinion, for example, pinion 6 in FIG. 2, may be positioned for engagement with grooves 21 of cylinder 12 without interfering with or contacting movable bar 13. Thus, longitudinal movement of cylinder 12 with corresponding movement of movable bar 13 will not rotate pinion 6, but rotation of cylinder 12 will rotate pinion 6, thereby generating a movement signal. On the other hand, if pinion 3 (not shown) is engaged with gear teeth 14 on the side of movable bar 13, gear pinion 3 will rotate in direct proportion to the longitudinal movement of movable bar 13, thereby generating another signal.

In another embodiment, a coupling element (not shown) having an outer periphery of, for example, rubber, replaces pinion 3. Movable bar 13 need not be provided with gear teeth 14. The coupling element is positioned for contact with a side of movable bar 13. In this manner, longitudinal movement of movable bar 13 results in movement of this coupling element.

Figure 12:
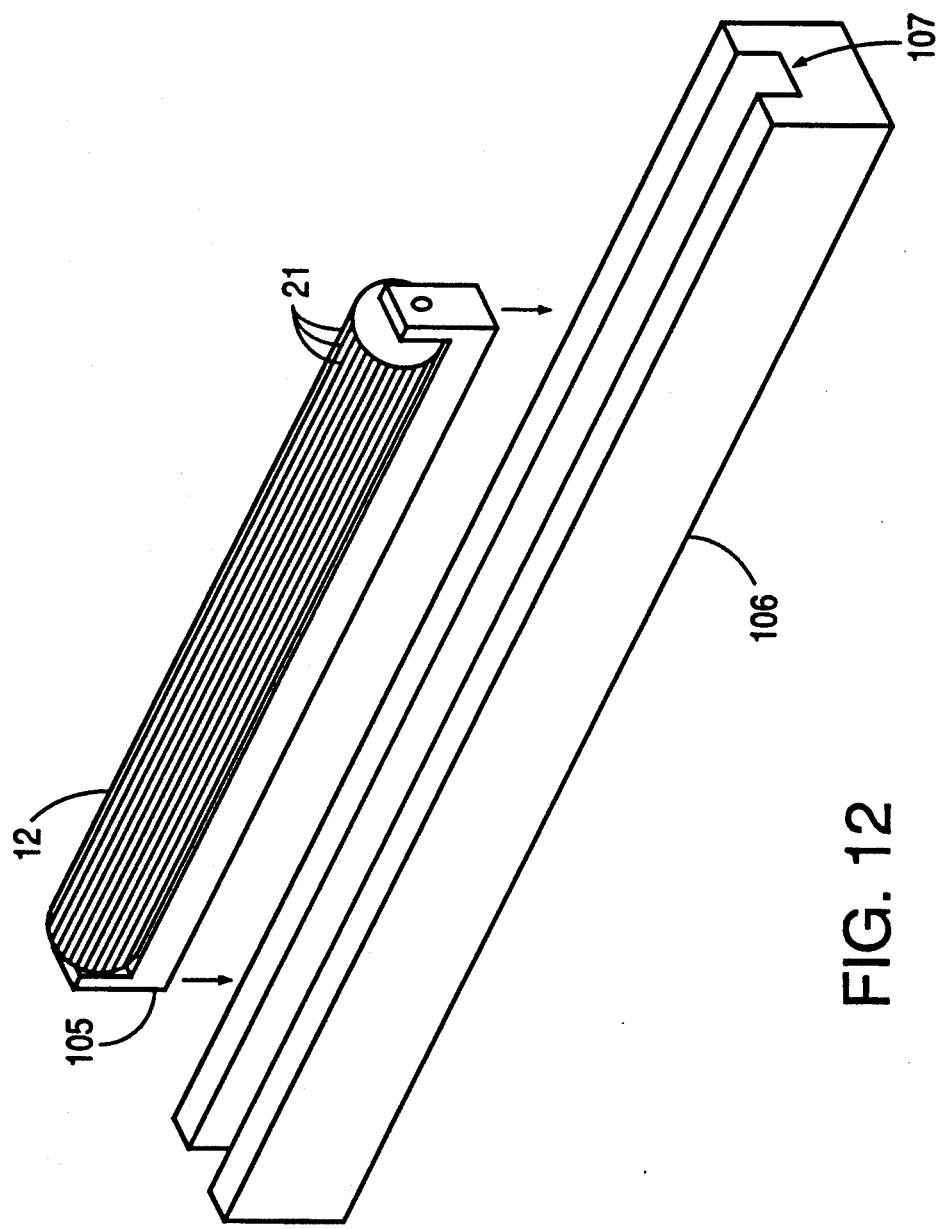
FIG. 12 shows another embodiment of the present invention in which the cylinder is mounted in a carrier movably slidable in a support containing a track.

FIG. 12 illustrates another embodiment of the present invention in which cylinder 12 is journalled in a slidable carrier 105. Carrier 105 is then positioned in a track 107 of support 106. In this manner, carrier 105 slides longitudinally in track 107. A pinion (not shown) is positioned on support 106 for contact with cylinder 12. Specifically, the teeth on this pinion mesh with grooves 21 of cylinder 12 to translate rotational movement of cylinder 12 to an encoder (not shown). Note that in this embodiment in which longitudinal grooves 21 are formed on cylinder 12 that linear movement of cylinder 12 is effectively detected by coupling an encoder (not shown) to carrier 105.

Figure 8:
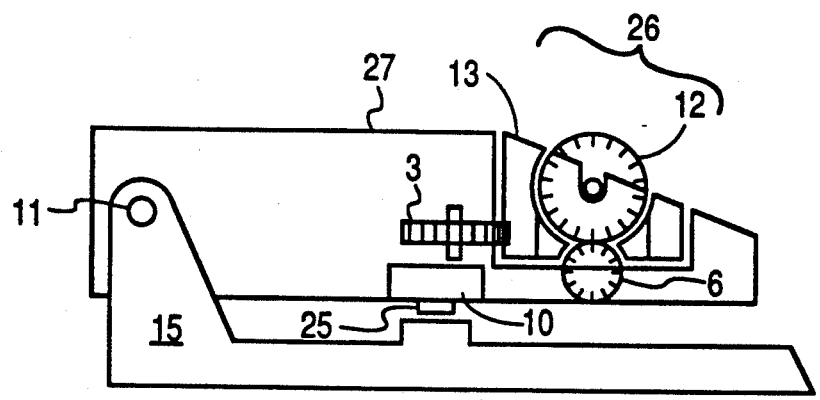
FIG. 8 shows a side view of a control assembly positioning a longitudinally movable bar and rotatable cylinder wherein depressing any one of the above features activates a switch.

FIG. 8 illustrates an embodiment of the present invention which combines the control mechanism 26 shown in FIG. 7 with a switch 10 that senses downward movement or pressure. Control structure 27 positions the control mechanism of FIG. 7 for contact with pinions 3 and 6 to respectively translate longitudinal and rotational movement of cylinder 12 to encoders (not shown). The base plate 15 supports the control structure 27 by means of two hinge pins 11 such that the control structure 27 rests on switch actuator 25 of switch 10. Hence, any downward pressure on cylinder 12, movable bar 13, or control structure 27 will activate switch 10, thereby generating a signal.

Figure 9:
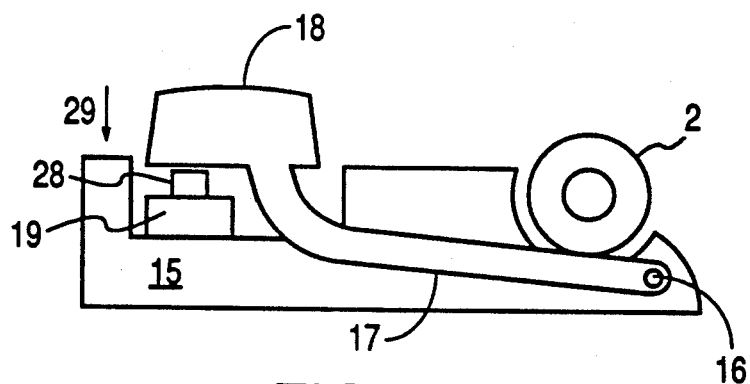
FIG. 9 illustrates a side view of another embodiment of this invention wherein a depressible bar is integrated with the structure so as to activate a switch.

FIG. 9 illustrates base plate 15 supporting cylinder 2 which may have grooves and associated pinions (not shown) similar to those shown in FIGS. 1, 2, or 3. Two arms 17 are movably mounted on hinge pins 16 and support on their opposite ends a switch bar 18 which is positioned above switch 19. Downward pressure indicated by arrow 29 on switch bar 18 rotates switch bar 18 about the axis formed by hinge pins 6, and depresses the actuator 28 of switch 19, thereby generating a signal. This embodiment of the present invention may be positioned in front of a keyboard, thereby eliminating the requirement for a separate space bar mechanism, which often consists of six or more parts and, therefore, requires additional labor and material costs. In accordance with the present invention, only two parts are required: switch 19 and switch bar 18.

The placement of hinge pins 16 forward of switch bar 18, and the use of reasonably long support arms 17 insure that the slight rotation of the switch bar 18 about hinge pins 16 is imperceptible to the operator. In fact, the slight rotation provided by the present invention is preferable to the pure vertical movement of a traditional space bar because the operator's thumb (which would normally operate the space bar) also rotates about an axis formed by the thumb joints, which are typically positioned above hinge pins 16. Thus, the slight arc movement of switch bar 18 more closely matches the typical movement of the operator's thumb.

Figure 10:
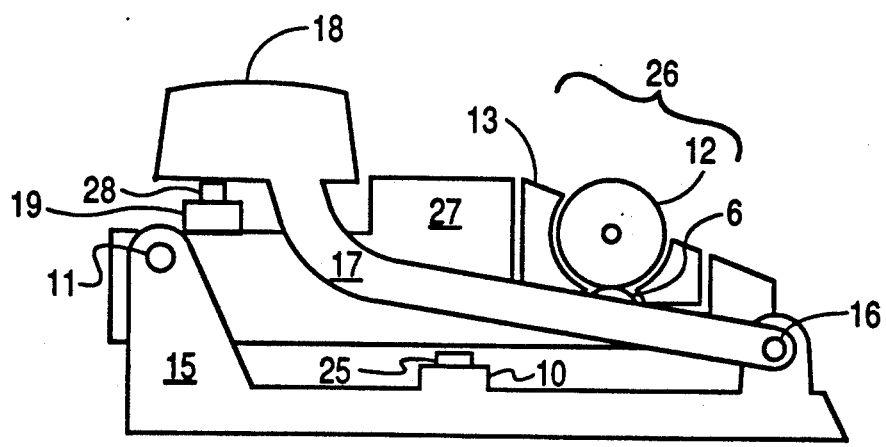
FIG. 10 shows a side view of another embodiment which includes a depressible bar to activate a first switch, wherein the control structure is also depressible so as to activate a second switch.

FIG. 10 illustrates another embodiment of the present invention which combines the features shown in FIG. 8 with a switch bar as illustrated in FIG. 9. In this manner, downward pressure on control assembly 26 or control structure 27 activates switch 10 while downward pressure on switch bar 18 activates switch 19. Placement of switch bar 18 and switch 19 adjacent to hinge pins 11 ensures that downward pressure on switch bar 18 does not translate from control structure 27 to switch 10.

Figure 13:
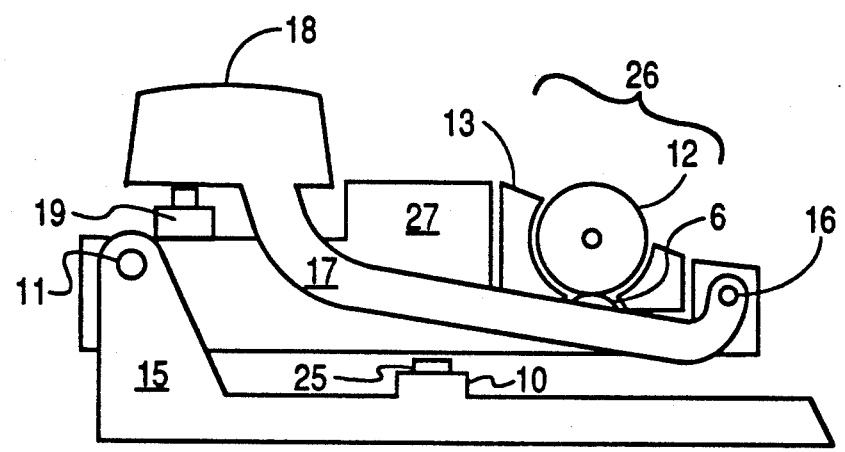
FIG. 13 illustrates a variation of the embodiment shown in FIG. 10.

FIG. 13 illustrates a variation of the embodiment shown in FIG. 10. In this embodiment, hinge pins 16 are located on control structure 27, not on base plate 15. However, because of the placement of switch bar 18 relative to hinge 11, the actuating forces for switch 19 are isolated from the actuating forces for switch 10.

Mechanical coupling, as described above, facilitates the use of motive feedback to send operator-detectable forces back to the control surface. This approach is further described in U.S. Pat. No. 4,823,634 and is incorporated herein by reference. In such a configuration, the position sensors accompanied by servomotors or other force transducers which, in response to feedback signals from the controlled device, apply forces to the cylinder. Therefore, the direct mechanical coupling of the control elements with sensors/actuators provides important feedback to the user.

The preceding description is meant to be illustrative only and not limiting. Those skilled in the art will be able to fabricate other devices in accordance with this invention based on the above description.

I claim:

1. A control mechanism comprising:
   means for guiding;
   a contiguous cylindrical element mounted on said means for guiding for rotational and longitudinal movement relative to said means for guiding, said cylindrical element having a plurality of grooves on its surface;
   movable coupling means having a plurality of projections positioned to mesh with said plurality of grooves on said cylindrical element; and
   means for supporting said coupling means and translating movement of said coupling means to an encoder.

2. The structure of claim 1 wherein said grooves are longitudinal with respect to an axis of said cylindrical element such that rotation of said cylindrical element rotates said movable coupling means.

3. The structure of claim 1 wherein said grooves are annular with respect to an axis of said cylindrical element such that longitudinal movement of said cylindrical element rotates said movable coupling means.

4. The structure of claim 1 wherein said grooves are comprised of a first set of grooves which are annular with respect to an axis of said cylindrical element, and a second set of grooves which are longitudinal with respect to said axis.

5. The structure of claim 4 wherein said movable coupling means comprises a plurality of coupling elements positioned to mesh with said plurality of grooves such that at least one of said coupling elements is positioned for movement with rotation of said cylindrical element; and at least one other of said coupling elements is positioned for movement as said cylindrical element is longitudinally moved.

6. A control mechanism comprising:
   means for guiding;
      a cylindrical element mounted on said means for guiding for rotational and longitudinal movement relative to said means for guiding, said cylindrical element having a plurality of grooves on its surface;
      movable coupling means having a plurality of projections positioned to mesh with said plurality of grooves on said cylindrical element; and
      means for supporting said coupling means and translating movement of said coupling means to an encoder,
   wherein said grooves are comprised of a first set of grooves which are annular with respect to an axis of said cylindrical element, and a second set of grooves which are longitudinal with respect to said axis,
   wherein said movable coupling means comprises a plurality of coupling elements positioned to mesh with said plurality of grooves such that at least one of said coupling elements is positioned for movement with rotation of said cylindrical element,
   wherein at least one other of said coupling elements is positioned for movement as said cylindrical element is longitudinally moved, and
   wherein said first set of grooves intersects said second set of grooves to form a grid pattern on said cylindrical element.

7. The structure of claim 1 further comprising a switch such that a predetermined pressure on said means for guiding activates said switch.

8. A structure for generating control signals in response to tactile inputs comprising:
   a support member having a guide;
   an elongated bar positioned on and longitudinally moveable along said guide;
   an elongated cylindrical member rotatably mounted on said elongated bar, said cylindrical member having a plurality of longitudinal grooves on its surface;
   a first coupling element having a plurality of projections positioned by said support member to mesh with said plurality of grooves on said cylindrical member;
   detection means for detecting movement of said elongated bar; and
   means for translating movement of said first coupling element and said detection means to a first and second encoder, respectively.

9. The structure of claim 8 wherein said support member is positioned for contact with a force-operable transducer, ad deflection of said support member causing contact with said transducer produces a signal output.

10. The structure of claim 9 further including:
    a switch bar depressibly coupled to said support member; and
    a switch positioned on said support member and intermediate said switch bar and said support member;
    wherein a predetermined pressure on said switch activates said switch.

11. The structure of claim 8 further including:
    a base plate depressibly supporting said support member; and
    a first force-operable transducer positioned on said base plate such that a first predetermined pressure on said cylindrical member, said elongated bar, or said support member produces a first signal output.

12. A structure for generating control signals in response to tactile inputs comprising:
    a support member having a guide;
    an elongated bar positioned on and longitudinally moveable along said guide;
    an elongated cylindrical member rotatably mounted on said elongated bar, said cylindrical member having a plurality of longitudinal grooves on its surface;
    a first coupling element having a plurality of projections positioned by said support member to mesh with said plurality of grooves on said cylindrical member;
    detection means for detecting movement of said elongated bar;
    means for translating movement of said first coupling element and said detection means to a first and second encoder, respectively;
    a base plate depressibly supporting said support member;
    a first force-operable transducer positioned on said base plate such that a first predetermined pressure on said cylindrical member, said elongated bar, or said support member produces a first signal output;
    a switch bar coupled to said base plate adjacent a first side of said base plate, said base plate depressibly supporting said support member on an opposite side of said first side of said base plate; and
    a second force-operable transducer positioned such that a second predetermined pressure on said switch bar produces a second signal output.

13. The structure of claim 1 further including:
    a switch bar depressibly coupled to said means for guiding; and
    a switch positioned on said means for guiding and intermediate said switch bar and said means for guiding;
    wherein a predetermined pressure on said switch bar activates said switch.

14. The structure of claim 5 further including:
    a switch bar depressibly coupled to said means for guiding; and
    a switch positioned on said means for guiding and intermediate said switch bar and said means for guiding;
    wherein a predetermined pressure on said switch bar activates said switch.

15. The structure of claim 1 further including a servomotor coupled to said cylindrical element such that movement of said cylindrical element is modified in response to a feedback signal.

16. The structure of claim 8 further including:

a servomotor coupled to said cylindrical member such that movement of said cylindrical member is modified in response to changes in a feedback signal.

17. The structure of claim 1 further including:

first means coupled to said cylindrical element for imparting to said cylindrical element, in response to a given signal applied to said first means, a first selected force.

18. The structure of claim 8 further including:

first means coupled to said cylindrical member for imparting to said cylindrical member, in response to a given signal applied to said first means, a first selected force; and second means coupled to said elongated bar for imparting to said elongated bar, in response to a given signal applied to said second means, a second selected force.

19. The structure of claim 1 wherein said means for guiding comprises a body having a surface for supporting said cylindrical element.

20. A control mechanism comprising:

means for guiding;

a cylindrical element mounted on said means for guiding for rotational and longitudinal movement relative to said means for guiding, said cylindrical element including an integrally formed first coupling means having a plurality of projections;

a second coupling means having a plurality of grooves on its surface positioned to mesh with said plurality of projections of said first coupling element; and means for supporting said second coupling element and translating movement of said second coupling element to an encoder.

* * * * *